United States Patent
Maejima et al.

(10) Patent No.: US 7,924,533 B2
(45) Date of Patent: Apr. 12, 2011

(54) MULTI-CHANNEL HEAD

(75) Inventors: Kazuhiko Maejima, Tokyo (JP); Yoshiyuki Mizoguchi, Tokyo (JP); Nobuya Oyama, Tokyo (JP); Hiraku Hirabayashi, Tokyo (JP); Hiroki Matsukuma, Tokyo (JP); Naoto Matono, Sakushi (JP)

(73) Assignees: TDK Corporation, Tokyo (JP); SAE Magnetics (H.K.) Ltd., Shatin, N.T. (HK)

( * ) Notice: Subject to any disclaimer, the term of this patent is extended or adjusted under 35 U.S.C. 154(b) by 598 days.

(21) Appl. No.: 11/740,530

(22) Filed: Apr. 26, 2007

(65) Prior Publication Data
US 2007/0291411 A1 Dec. 20, 2007

(30) Foreign Application Priority Data

Jun. 15, 2006 (JP) ................. 2006-166637
Jun. 21, 2006 (JP) ................. 2006-171688

(51) Int. Cl.
*G11B 5/33* (2006.01)
*G11B 5/127* (2006.01)
(52) U.S. Cl. ...................... 360/316; 360/121
(58) Field of Classification Search .............. 360/316, 360/121
See application file for complete search history.

(56) References Cited

U.S. PATENT DOCUMENTS

| | | | | |
|---|---|---|---|---|
| 5,218,498 | A * | 6/1993 | Jagielinski | 360/316 |
| 5,331,493 | A * | 7/1994 | Schwarz | 360/316 |
| 5,917,671 | A * | 6/1999 | Kaaden et al. | 360/77.12 |
| 6,650,496 | B2 * | 11/2003 | Nozieres et al. | 360/63 |
| 6,826,020 | B2 * | 11/2004 | Daby et al. | 360/317 |
| 2003/0011922 | A1 * | 1/2003 | Nozieres et al. | 360/61 |
| 2005/0013042 | A1 * | 1/2005 | Rubas et al. | 360/121 |
| 2005/0152067 | A1 * | 7/2005 | Yip et al. | 360/241.1 |

FOREIGN PATENT DOCUMENTS
JP 2005-276267 10/2005

OTHER PUBLICATIONS
U.S. Appl. No. 11/868,699, filed Oct. 8, 2007, Maejima, et al.

* cited by examiner

*Primary Examiner* — Brian E Miller
*Assistant Examiner* — Adam B Dravininkas
(74) *Attorney, Agent, or Firm* — Oblon, Spivak, McClelland, Maier & Neustadt, L.L.P.

(57) ABSTRACT

A multi-channel head includes a substrate, a plurality of write elements arranged in a track width direction above the substrate in a lamination direction, and a plurality of read elements arranged in the track width direction above the plurality of write elements in the lamination direction. At least one of the plurality of write elements is offset from the others in the lamination direction. All the plurality of read elements are located higher than an uppermost one of the plurality of write elements in the lamination direction.

6 Claims, 11 Drawing Sheets

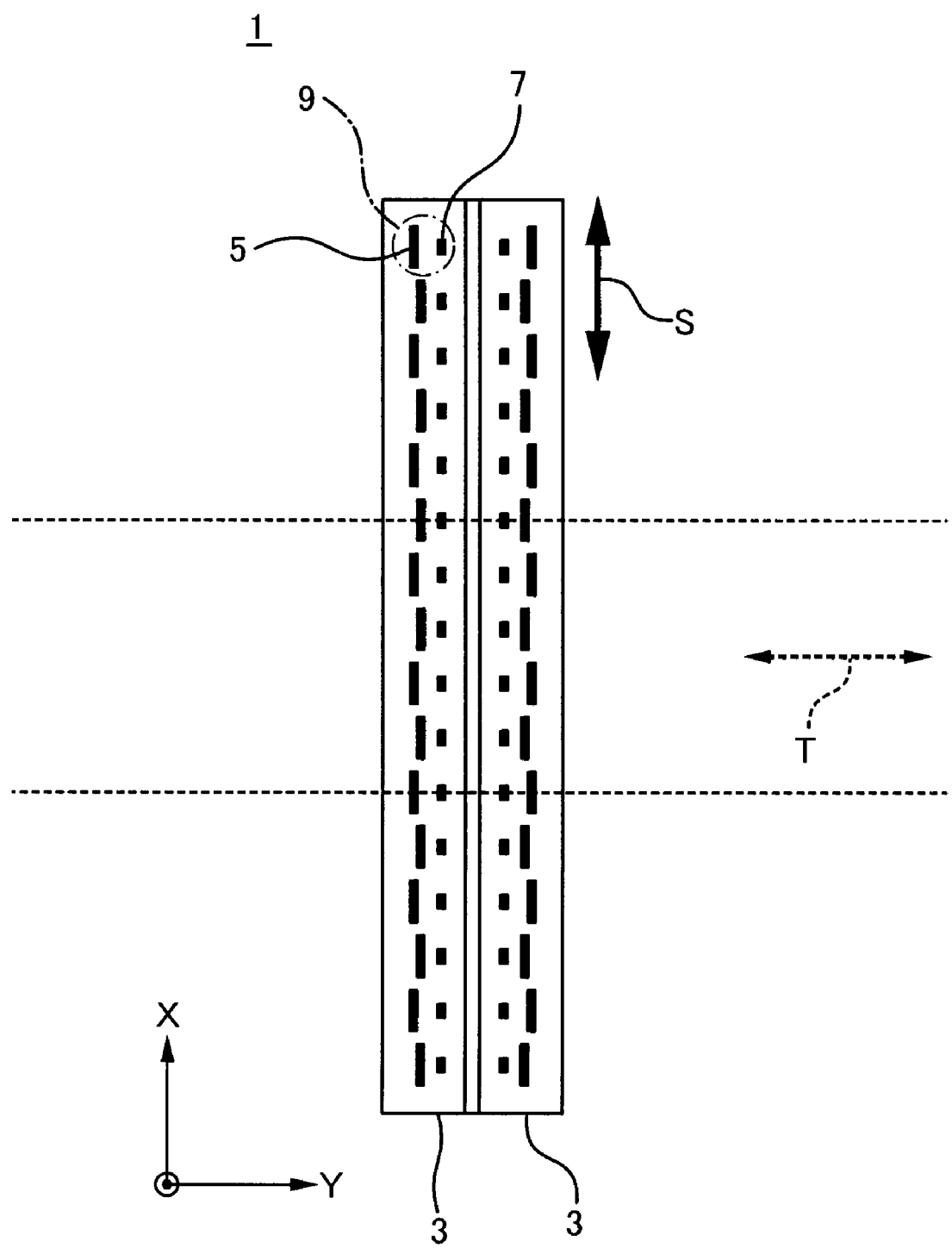
F I G. 1

MULTI-CHANNEL HEAD

BACKGROUND OF THE INVENTION

1. Field of the Invention

The present invention relates to a multi-channel head with a plurality of recording elements and a plurality of reproducing elements.

2. Description of the Related Art

In the computer field, data storage devices for recording and reproducing magnetic information with respect to a linear tape have been developed as a data backup device. Japanese Unexamined Patent Application Publication No. 2005-276267 discloses a multi-channel head to be used in such a data storage device.

In the multi-channel head, a plurality of recording elements and a plurality of reproducing elements are arranged in a direction perpendicular to a linear tape travel direction. More specifically, there are provided a plurality of element pairs each composed of one recording element and one reproducing element, and these element pairs themselves are arranged in the direction perpendicular to the linear tape travel direction. In addition, the recording element of each element pair is aligned with the recording element of an adjacent element pair in the direction perpendicular to the linear tape travel direction. This is true for the reproducing elements, so that the reproducing element of each element pair is aligned with the reproducing element of an adjacent element pair in the direction perpendicular to the linear tape travel direction.

Recently, higher capacity and faster reading and writing are expected for recording and reproducing of magnetic information, and therefore the multi-channel heads are also required to have a smaller pitch distance between adjacent elements.

SUMMARY OF THE INVENTION

It is an object of the present invention to provide a multi-channel head with a smaller pitch.

In order to achieve the above object, a multi-channel head according to a first aspect of the present invention comprises:

a substrate;

a plurality of write elements arranged in a track width direction above the substrate in a lamination direction; and a plurality of read elements arranged in the track width direction above the plurality of write elements in the lamination direction, wherein at least one of the plurality of write elements is offset from the others in the lamination direction, and all the plurality of read elements are located higher than an uppermost one of the plurality of write elements in the lamination direction.

Another multi-channel head according to the first aspect of the present invention comprises:

a substrate;

a plurality of write elements arranged in a track width direction above the substrate in a lamination direction; and a plurality of read elements arranged in the track width direction above the plurality of write elements in the lamination direction, wherein at least one of the plurality of write elements is offset from the others in the lamination direction, and a yoke-to-yoke distance between adjacent write elements offset from each other in the lamination direction is set equal to or greater than 3.0 µm.

A multi-channel head according to a second aspect of the present invention comprises:

a substrate;

a plurality of write elements arranged in a track width direction above the substrate in a lamination direction; and a plurality of read elements, wherein the plurality of write elements include coils, and the coils are offset from each other in the lamination direction at least in one pair of write elements adjacent each other in the track width direction.

In the multi-channel heads according to the first aspect of the present invention, since the plurality of write elements are disposed in multilevels, the mutual interference between coils can be avoided to decrease the distance between the write elements in the track width direction, which results in a smaller pitch.

In the multi-channel heads according to the second aspect of the present invention, since the coils are offset from each other in the lamination direction in the write elements adjacent each other in the track width direction, the mutual interference between the coils can be avoided to decrease the distance between the write elements in the track width direction, which results in a smaller pitch.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 1 is a view showing a multi-channel head according to one embodiment of the present invention;

DESCRIPTION OF THE PREFERRED EMBODIMENTS

Figure 2:
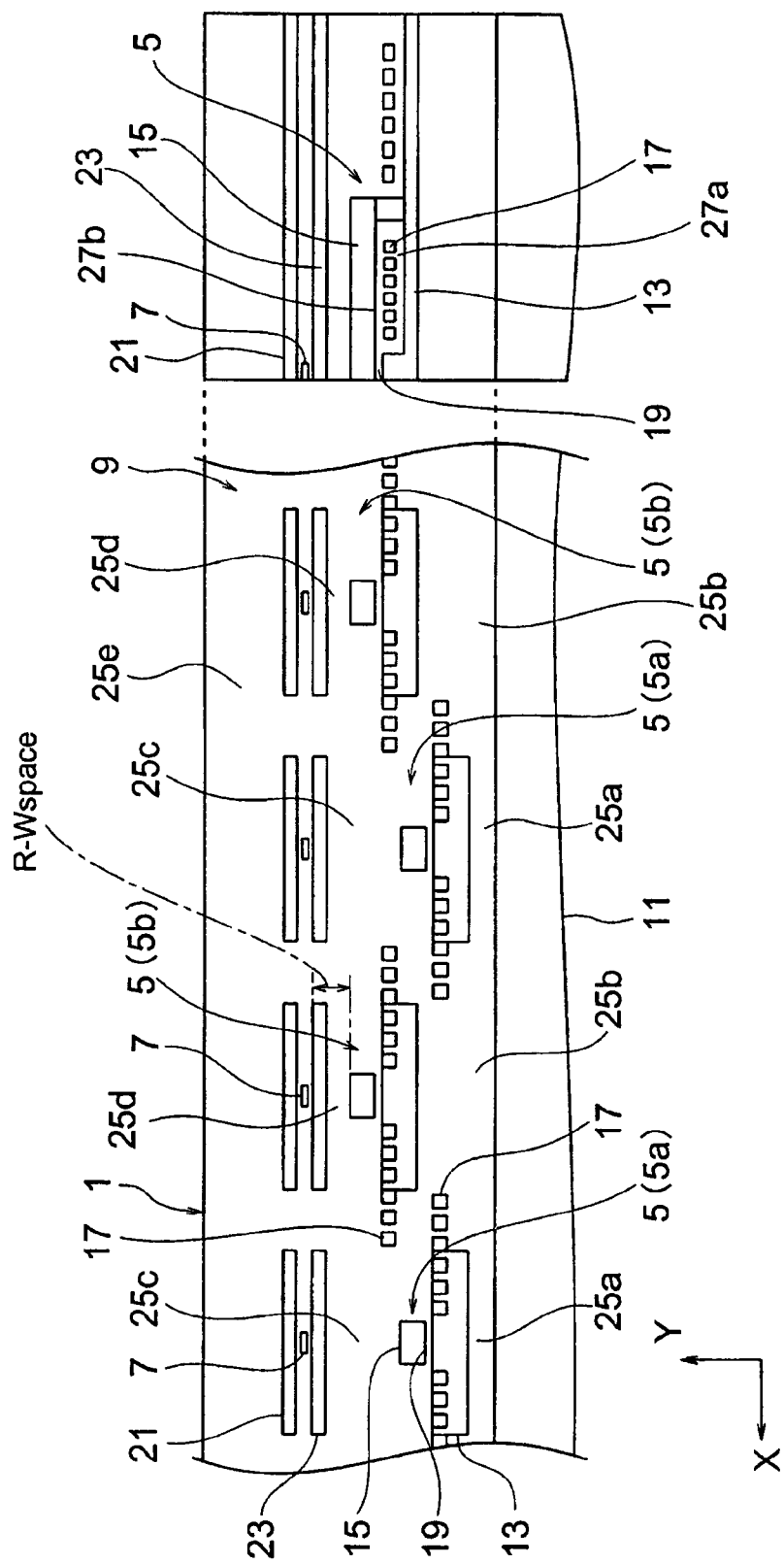
FIG. 2 is an enlarged view showing element pairs in a head chip according to one embodiment of the present invention, including both a view seen from a medium-facing surface side and a view seen from a lateral surface side.

Hereinbelow embodiments of the present invention will be described with reference to the accompanying drawings. In the drawings, the same reference symbols denote the same or corresponding portions. Throughout the description and claims, a vertical direction is a direction parallel to a lamination direction, wherein "lower" refers to a side close to a substrate, while "upper" refers to a side close to a protective layer.

The multi-channel head according to the present invention is applicable to a magnetic tape recorder such as of LTO (linear tape-open) technology for backing up data of computer, as a magnetic head for recording and reproducing magnetic information with respect to a linear tape.

Embodiment 1

FIG. 1 shows a multi-channel head 1 according to a first embodiment of the present invention. The multi-channel head 1 is constructed by symmetrically bonding together two strip-shaped head chips 3. Each head chip 3 has a plurality of write elements 5 and a plurality of read elements 7.

In the present embodiment, more specifically, each head chip 3 has sixteen element pairs 9, wherein each element pair 9 is composed of one write element 5 and one read element 7. The element pairs 9 are arranged in a track width direction X, which is a shift direction S of the multi-channel head 1 and substantially perpendicular to a travel direction T of a linear tape.

Next will be described principal parts of the head chip with reference to FIG. 2. FIG. 2 is an enlarged view showing four element pairs in the head chip, including both a view seen from a medium (linear tape)-facing surface side and a view seen from a lateral surface side. It should be noted that, in the view seen from the medium-facing surface side, coils are projectively shown for clarity.

The head chip 3 has a layered structure of a plurality of films. Above a substrate 11 in a lamination direction Y, a plurality of write elements 5 are arranged in the track width direction X. Above the plurality of write elements 5 in the lamination direction Y, moreover, a plurality of read elements 7 are arranged in the track width direction X.

The write element 5 and the read element 7 may have any known structure, and therefore, their structures will be briefly described below. The write element 5 includes a lower yoke 13 (including a lower pole portion), an upper yoke 15 (including an upper pole portion), a coil 17, and a gap film 19. The read element 7 is a magneto-resistive film such as a GMR or TMR film. Above and below the read element 7 in the lamination direction Y, there are disposed an upper magnetic shield 21 and a lower magnetic shield 23, respectively.

The plurality of read elements 5 have the same size and structure but are disposed in multilevels to have different vertical positions in the lamination direction Y. In the present embodiment, each head chip 3 has sixteen write elements 5, which can be classified into two groups: eight write elements 5 (5a) disposed at a lower level close to the substrate 11; and eight write elements 5 (5b) disposed at an upper level remote from the substrate 11. In addition, the write elements 5 are arranged such that the upper write elements 5 and the lower write elements 5 alternate with each other. Hence, as seen from the medium-facing surface side, the lower yokes 13 (more precisely, their pole portions) and the upper yokes 15 (more precisely, their pole portions) of the write elements 5 are arranged in a staggered manner.

It should be noted that the above described arrangement is a mere example, and therefore the number of write elements 5 in one head chip 3 may be arbitrarily changed. In addition, the number of levels is not limited to two as described above, and therefore they may be disposed in three or more levels.

Moreover, it is not necessarily required to offset any write element 5 from a next write element 5 in the vertical direction. That is, the head chip 3 may partially have an arrangement in which write elements 5 level with each other at both upper and lower ends are disposed adjacent to each other.

All the plurality of write elements 7 are located higher than the uppermost ones (5b) of the plurality of write elements 5 in the lamination direction. In the present embodiment, for example, all the plurality of write elements 7 are level with each other at both upper and lower ends in the lamination direction Y. Likewise, all the upper magnetic shields 21 and all the lower magnetic shields 23 are respectively level with each other in the lamination direction Y at both upper and lower ends. Since the read elements do not have the problem of interference between coils unlike the write elements, such an arrangement will not interfere with reducing the pitch but is rather desirable so as to simplify the production process and make the most use of existing arrangements. It should be noted that if required to further reduce the pitch, the read elements may also have different vertical positions with respect to the lamination direction, and the present invention should not be construed as excluding such an arrangement.

Next will be described a production process of the multi-channel head 1 according to the present embodiment shown in FIG. 1. The multi-channel head 1 is constructed by symmetrically bonding together the two strip-shaped head chips 3, and each head chip 3 is manufactured as follows. Here, film formation and patterning for the write element 5, the read element 7 and the surroundings may be performed by conventional processes, and therefore their detailed description is omitted.

At first, the substrate 11 is formed as a layer. Then, above the substrate 11, the lower write elements 5 (5a) are formed to have spacer layers 25a with a given thickness, and the upper write elements 5 (5b) are also formed to have spacer layers 25b with a larger thickness than the spacer layers 25a. In the formation process of the write element 5, a thermal effect treatment is performed upon formation of an insulating layer 27a between the lower yoke 13 and the coil 17 and formation of an insulating layer 27b between the coil 17 and the upper yoke 15.

Above the lower write elements 5 (5a) and the upper write elements 5 (5b), moreover, there are formed spacer layers 25c and spacer layers 25d, respectively. The spacer layer 25c has a larger thickness than the spacer layer 25d. Subsequently, the lower magnetic shields 23, the read elements 7, the upper magnetic shields 21, and a protective layer 25e are formed above them.

Figure 3:
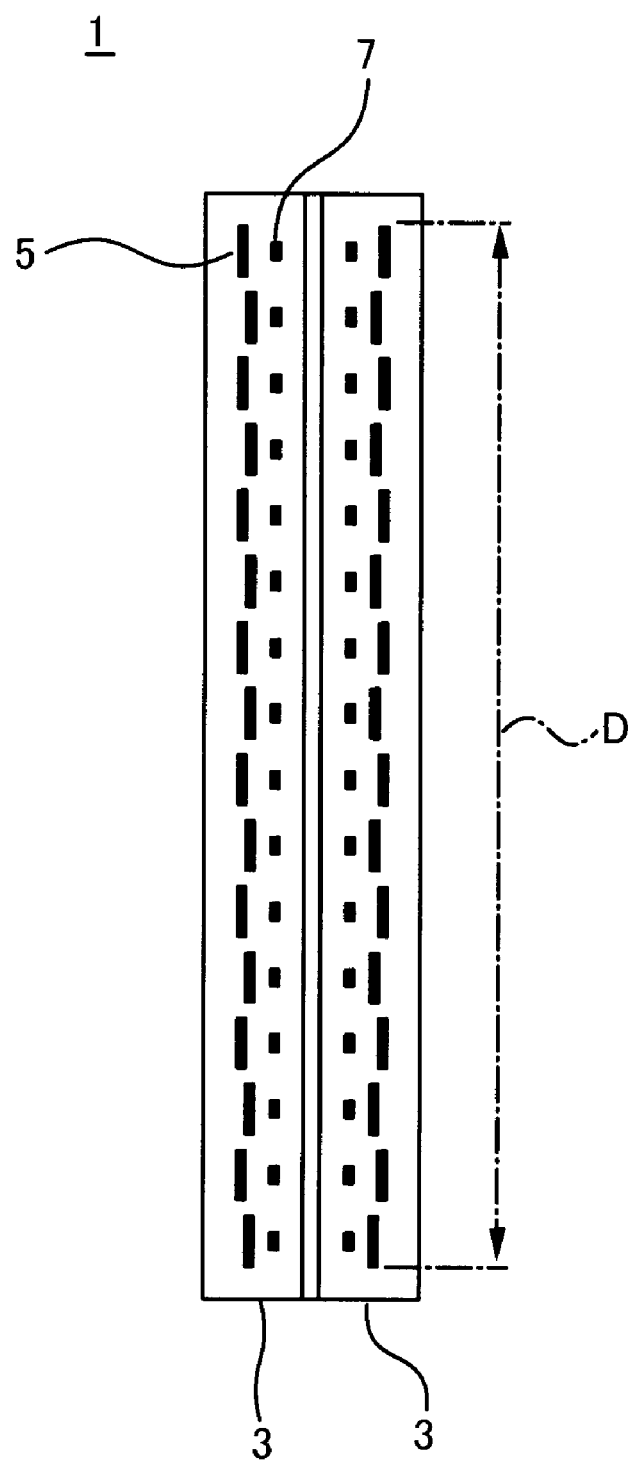
FIG. 3 is a view of a multi-channel head according to one embodiment of the present invention, showing the number of write elements and read elements within a given dimension in a track width direction.

In the head chip 3 of the foregoing multi-channel head 1, the plurality of write elements 5 are disposed in multilevels to have different vertical positions in the lamination direction Y. Therefore, the coils 17 of offset write elements 5 look as if they overlap with each other in the plan view but are actually not in contact with each other. The distance between the write elements 5 in the track width direction X can be reduced accordingly, which results in a smaller pitch. Concretely, as shown in FIG. 3, sixteen element pairs 9, i.e., sixteen write elements 5 and sixteen read elements 7 can be arranged within a dimension D=2.5 mm in the track width direction X.

In the formation process of the write element 5, moreover, a heat treatment has to be performed upon formation of the respective insulating layers 27a, 27b holding the coil 17 therebetween, but in the present embodiment, since all the plurality of read elements 7 are located higher than the uppermost ones (5b) of the plurality of write elements 5 in the lamination direction, the film formation of the read elements 7 can be performed after completion of the heat treatment of the uppermost insulating layers 27b. This avoids the property deterioration of the read elements 7 due to heating. That is, although the write elements 5 are disposed in multilevels so as to reduce the pitch, the property deterioration of the read elements 7 due to heating can be prevented.

Figure 4:
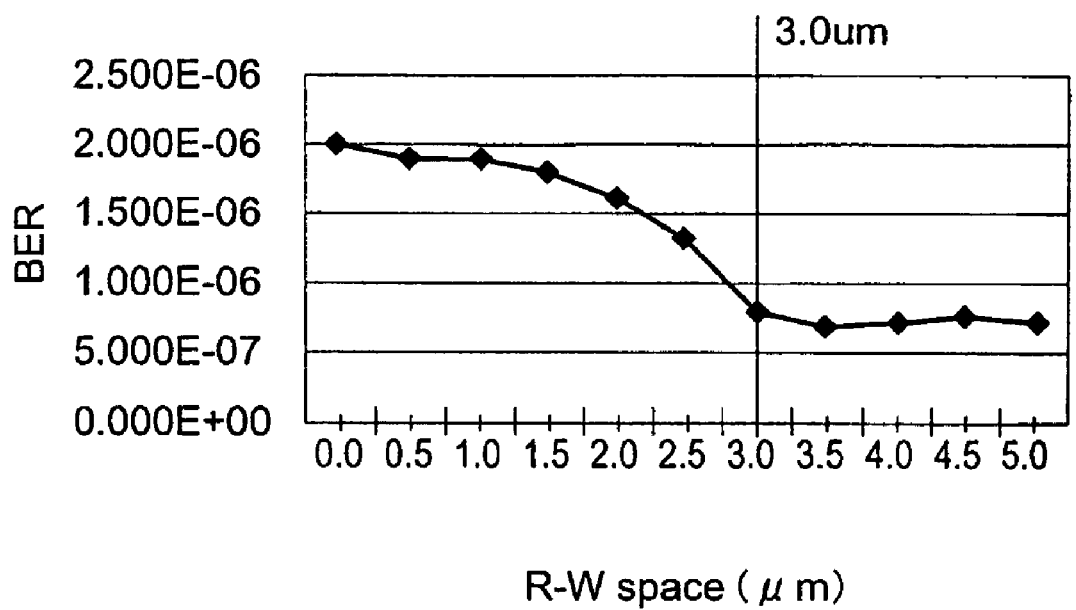
FIG. 4 is a graph showing a relationship between BER and a distance between an upper write element and a read element paired therewith in a lamination direction.

The present inventors have also investigated the relationship between BER (bits error rate) and an R-W space that is a distance between the upper write element 5 (5b) and the read element 7 paired therewith in the lamination direction. The results are shown in the graph of FIG. 4. It is seen from FIG. 4 that the distance between the upper write element 5 (5b) and the read element 7 paired therewith in the lamination direction is preferably equal to or greater than 3.0 µm in order to keep BER low, more preferably equal to or greater than 3.2 µm in view of actual unevenness. It should be noted that strictly speaking, the R-W space refers to a distance between an upper surface of the upper pole portion of the write element 5 and an upper surface of the lower magnetic shield 23 below the read element 7.

Embodiment 2

A multi-channel head according to a second embodiment of the present invention may have the same configuration as the first embodiment except for the following features about the arrangement of the read elements and the distance between adjacent write elements.

The multi-channel head according to the second embodiment is not limited to the foregoing arrangement in which all the read elements are located higher than the uppermost ones of the write elements in the lamination direction, and for example, the read elements 7 may also be disposed in multilevels in accordance with the multilevel arrangement of the write elements to have a uniform distance between the read elements and the write elements in the lamination direction. In addition, it is not necessarily required to pair the read element with the write element and to have an equal number of read elements and write elements. Needless-to-say, the second embodiment should not be construed as excluding the same configuration as the first embodiment with respect to the read elements and may have the same configuration as the first embodiment.

Figure 5A:
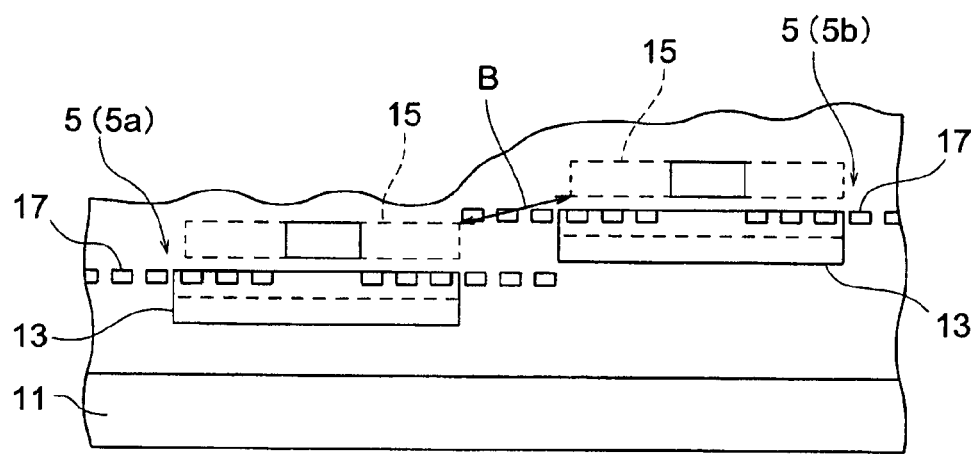
FIGS. 5A and 5B are views showing a relationship between adjacent write elements from a medium-facing surface side and a layer surface side, respectively, according to another embodiment of the present invention.
Figure 5B:
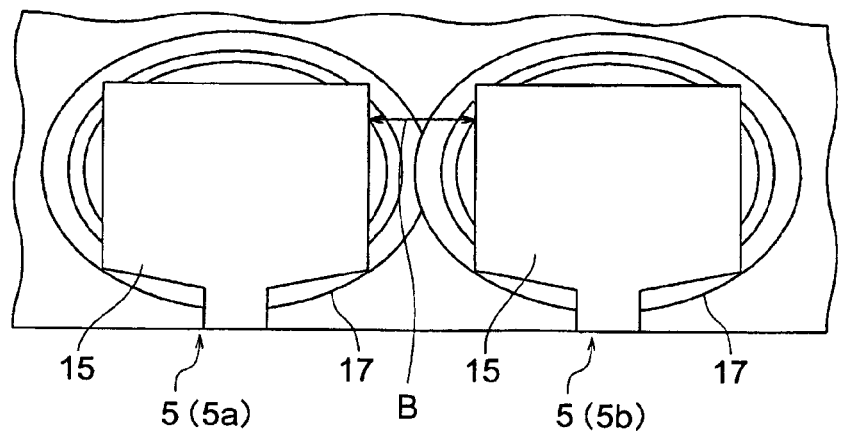

As one feature of the multi-channel head according to the second embodiment, the distance between adjacent write elements is set as follow. FIGS. 5A and 5B are views showing a relationship between adjacent write elements: FIG. 5A is a view seen from a medium-facing surface side; and FIG. 5B is a view seen from a layer surface side. Also in the second embodiment, the multi-channel head 1 has a plurality of write elements 5 which are disposed in multilevels to have different vertical positions in the lamination direction Y as in the first embodiment and each include the lower yoke 13, the coil 17 and the upper yoke 15. Moreover, a distance between adjacent magnetic portions of the lower write element 5 (5a) and the upper write element 5 (5b), which is a minimum yoke-to-yoke distance B in the present embodiment (or merely referred to as "yoke-to-yoke distance"), is set equal to or greater than 3.0 µm.

In the multi-channel head according to the second embodiment, since the plurality of write elements 5 are disposed in multilevels to have different vertical positions in the lamination direction Y, as in the first embodiment, the mutual interference between the coils 17 can be avoided to decrease the distance between the write elements 5 in the track width direction X, which results in a smaller pitch.

In addition, the yoke-to-yoke distance B between the lower write element 5 (5a) and the upper write element 5 (5b) is set equal to or greater than 3.0 µm. Accordingly, the attempt to reduce the pitch will not cause the problem of impairing desired writing characteristics because of the mutual interference between magnetic fields excited by write currents flowing through the coils 17.

Figure 6:
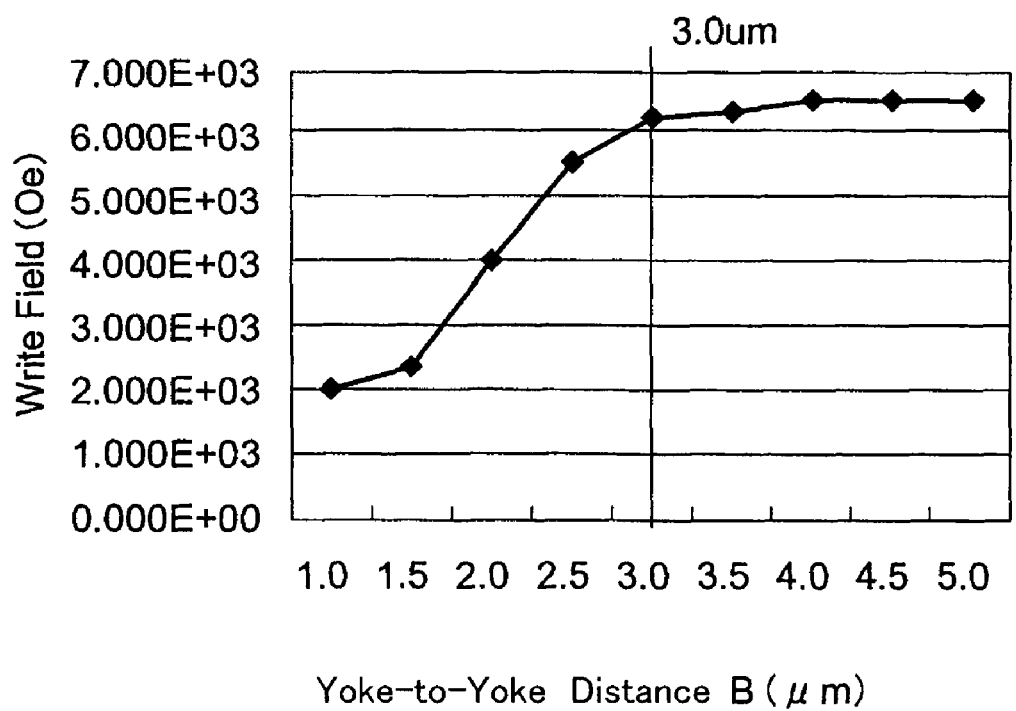
FIG. 6 is a graph showing a relationship between a magnetic field generated by a coil upon writing and a yoke-to-yoke distance between upper and lower write elements.

In this regard, the present inventors have investigated a relationship between a magnetic field generated by the coil upon writing (or write field) and the yoke-to-yoke distance B between the upper and lower write elements. The results are show in the graph of FIG. 6. It is seen from FIG. 6 that if the yoke-to-yoke distance B between the upper and lower write elements is equal to or greater than 3.0 µm, the magnetic field generated by the coil upon writing can be kept high to maintain proper writing characteristics while reducing the pitch.

Embodiment 3

Figure 7:
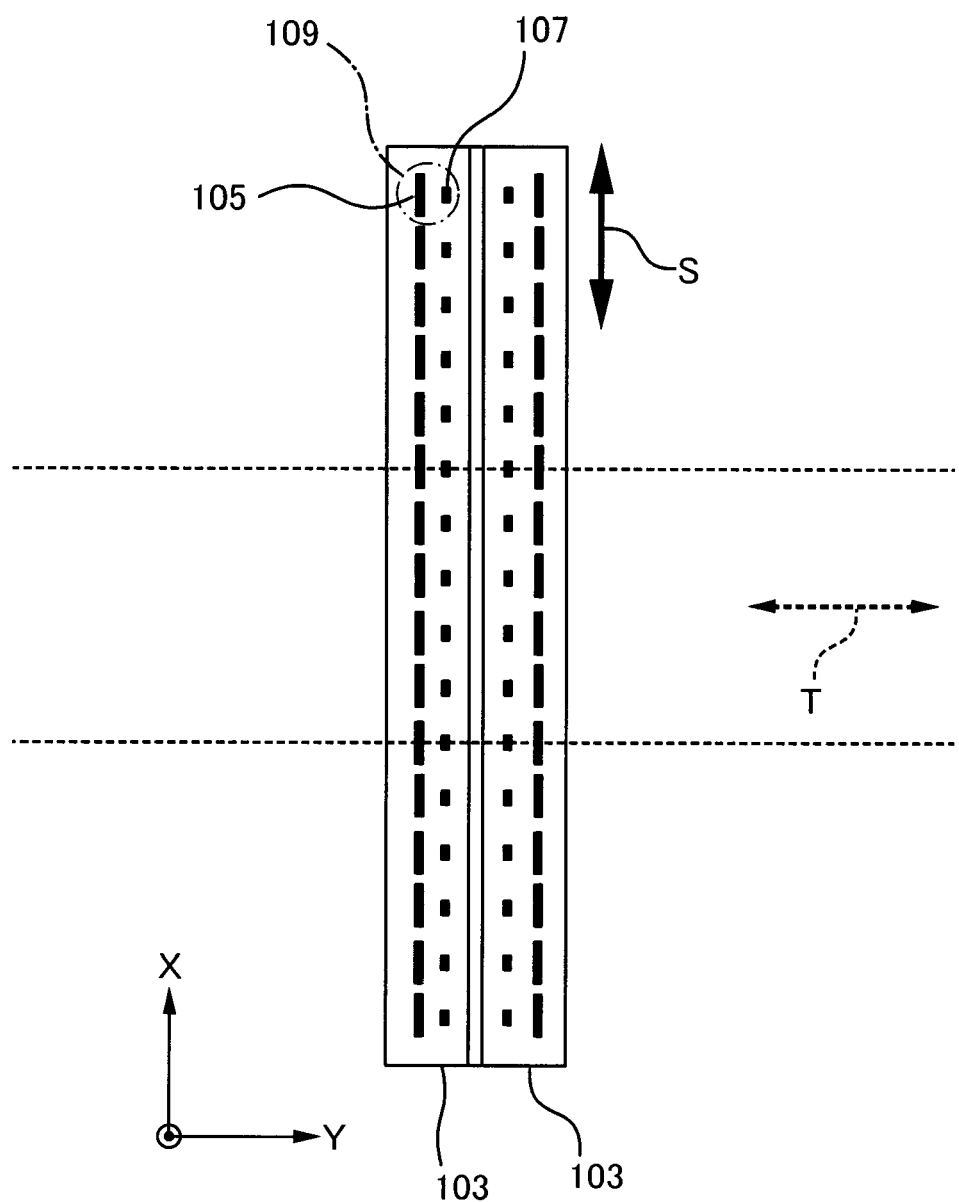
FIG. 7 is a view showing a multi-channel head according to still another embodiment of the present invention.

FIG. 7 shows a multi-channel head 101 according to a third embodiment of the present invention. The multi-channel head 101 is constructed by symmetrically bonding together two strip-shaped head chips 103. Each head chip 103 has a plurality of write elements 105 and a plurality of read elements 107.

In the present embodiment, more specifically, each head chip 103 has sixteen element pairs 109, wherein each element pair 109 is composed of one write element 105 and one read element 107. The element pairs 109 are arranged in a track width direction X, which is a shift direction S of the multi-channel head 101 and substantially perpendicular to a travel direction T of a linear tape.

Figure 8:
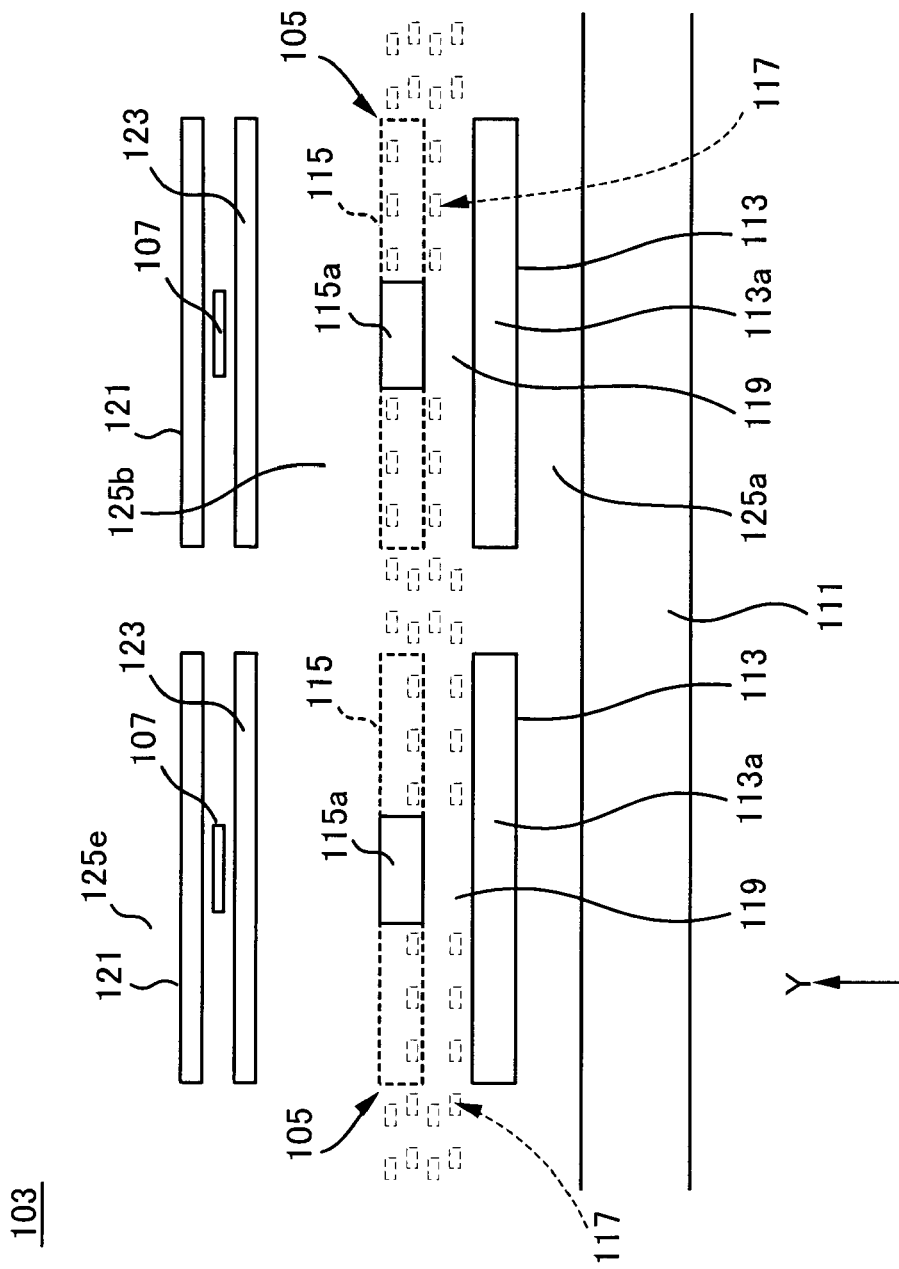
FIG. 8 is a partially enlarged view showing element pairs in a head chip and is an end view on a medium-facing surface.
Figure 9:
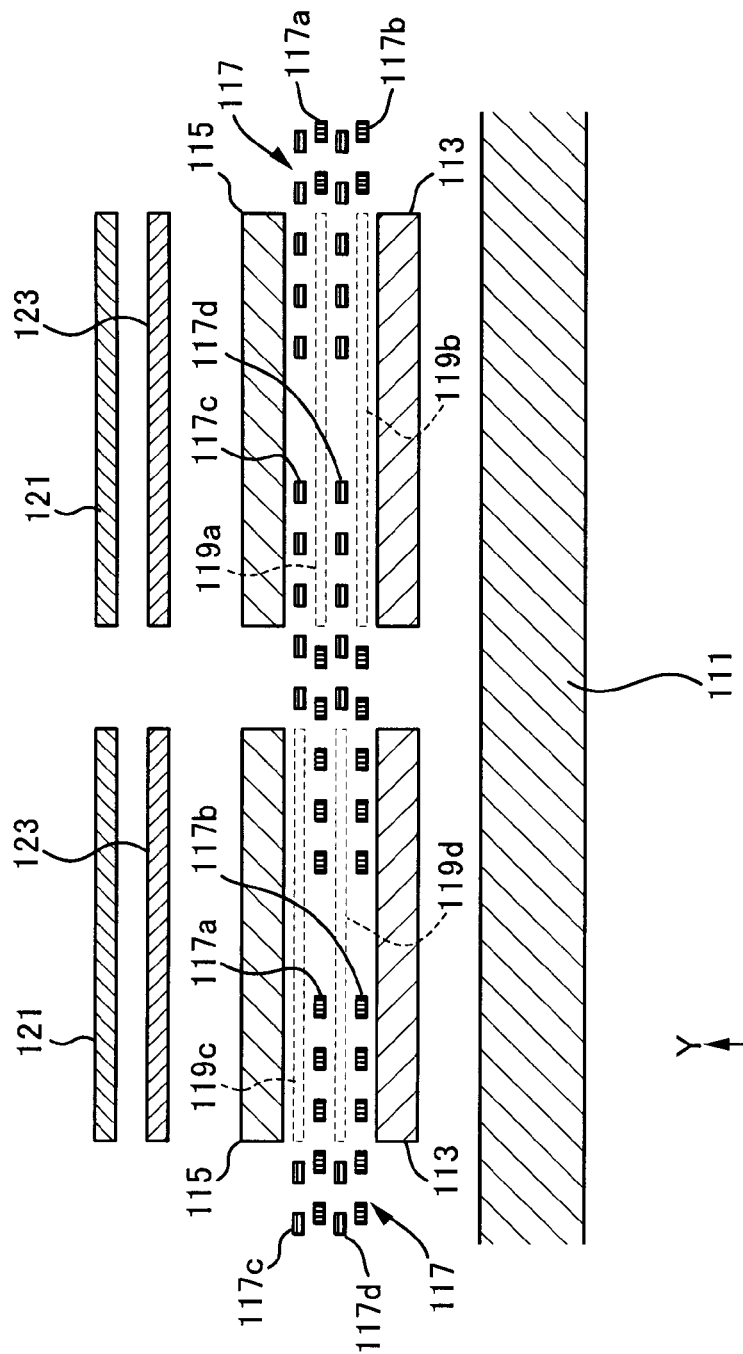
FIG. 9 is a partially enlarged view showing element pairs in a head chip and is a sectional view taken along a plane crossing a coil.

Next will be described principal parts of the head chip with reference to FIGS. 8 and 9. FIGS. 8 and 9 are partially enlarged views showing two element pairs in the head chip, which is seen from a medium (linear tape)-facing surface side. Here, FIG. 8 is an end view on the medium-facing surface, while FIG. 9 is a sectional view taken along a plane crossing a coil.

The head chip 103 has a layered structure of a plurality of films. Above a substrate 111 in a lamination direction Y, a plurality of write elements 105 are arranged in the track width direction X. Above the plurality of write elements 105 in the lamination direction Y, moreover, a plurality of read elements 107 are arranged in the track width direction X.

As shown in FIG. 8, the write element 105 includes a lower yoke 113 including a lower pole portion 113a, an upper yoke 115 including an upper pole portion 115a, a coil 117, and a gap film 119. The read element 107 is a magneto-resistive film such as a GMR or TMR film. Above and below the read element 107 in the lamination direction Y, there are disposed an upper magnetic shield 121 and a lower magnetic shield 123, respectively.

Between a pair of write elements 105 adjacent each other in the track width direction X, as shown in FIG. 9, the coils 117 have different positions in the lamination direction. In the present embodiment, more specifically, each coil 117 is of a two-layer structure. In FIG. 9, the left-side coil 117 has an upper coil layer 117a and a lower coil layer 117b, while the right-side coil 117 has an upper coil layer 117c and a lower coil layer 117d. The upper and lower coil layers 117a, 117b of the left-side coil 117 are offset from the upper and lower coil layers 117c, 117d of the right-side coil 117 in the lamination direction. In more detail, the right-side lower coil layer 117d is located higher than the left-side lower coil layer 117b in the lamination direction, the left-side upper coil layer 117a is located higher than the right-side lower coil layer 117d in the lamination direction, and the right-side upper coil layer 117c is located higher than the left-side upper coil layer 117a in the lamination direction.

Based on such an offset in the lamination direction, the right ends of the left-side upper and lower coil layers 117a, 117b and the left ends of the right-side upper and lower coil layers 117c, 117d has an overlap area in which they overlap with each other in the track width direction X as viewed projectively in the lamination direction Y.

With the above configuration, moreover, the right-side coil 117 is provided with a first insulating layer 119b at the same level as the left-side lower coil layer 117b in the lamination direction. The left-side coil 117 is provided with a second insulating layer 119d at the same level as the right-side lower coil layer 117d in the lamination direction. The right-side coil 117 is provided with a third insulating layer 119a at the same level as the left-side upper coil layer 117a in the lamination direction. The left-side coil 117 is provided with a fourth insulating layer 119c at the same level as the right-side upper coil layer 117c in the lamination direction.

Furthermore, FIG. 9 shows a part of coil layers designated by 117c, 117d in proximity to the left ends of the coil layers 117a, 117b of the left-side coil. That is, the right ends of the coil layers of the further left-side coil are depicted in the drawing. Similar is true for a part of coil layers designated by 117a, 117b on the rightmost side of FIG. 9. That is, the left ends of the coil layers of the further right-side coil are depicted in the drawing. In the present embodiment, as understood from above, the lower coils of the coil layers 117a, 117b and the upper coils of the coil layers 117c, 117d alternate with each other in the track width direction. Here, layers that are level with each other in the lamination direction are designated by a reference numeral with a common lower-case alphabetic character "a", "b", "c" or "d".

The arrangement shown in FIG. 9 is a mere example, and in the multi-channel head according to the present invention, the coil of the write element is not necessarily required to be a two-layer coil but may have three or more coil layers or, contrarily, only one coil layer. In addition, it is not necessarily required in all pairs of write elements adjacent each other in the track width direction that the coils have different positions in the lamination direction, and other arrangements of the write elements are encompassed by the present invention as long as the coils have different positions in the lamination direction at least in one pair of write elements adjacent each other in the track width direction. Furthermore, the present invention encompasses an embodiment in which the coil layers of any pair of coils adjacent in the track width direction do not overlap with each other as viewed projectively in the lamination direction Y.

Still furthermore, although the embodiment shown in FIG. 9 has a two-level arrangement in which the lower coils of the coil layers 117a, 117b and the upper coils of the coil layers 117c, 117d alternate with each other, the present invention is not limited thereto and may have an upper-middle-lower three-level arrangement or may also be embodied in four or more levels.

While the coils have different positions in the lamination direction, as described above, the lower and upper pole portions 113a, 115a exposed on the medium-facing surface are respectively aligned to be level with each other in the lamination direction between the write elements arranged in the track width direction, as shown in FIG. 8.

Next will be described a production process of the multi-channel head 101 according to the present embodiment. The multi-channel head 101 is constructed by symmetrically bonding together the two strip-shaped head chips 103, and each head chip 103 is manufactured as follows. Here, film formation and patterning may be performed by conventional processes, and therefore their detailed description is omitted.

At first, the substrate 111 is formed as a layer. Then, above the substrate 111, the lower yokes 113 are formed to have spacer layers 125a with a given thickness. Above it, the coils 117, the gap films 119, and the upper pole portions 115a of the upper yokes 115 are formed, and thereafter the yoke portions of the upper yokes 115 other than the pole portions are formed.

Figure 10A:
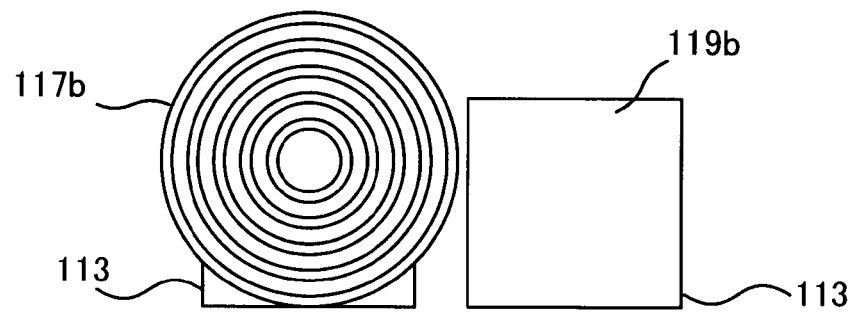
FIGS. 10A, 10B, 10C and 10D are views showing a production process of coil layers for write elements adjacent each other in a track width direction.
Figure 10B:
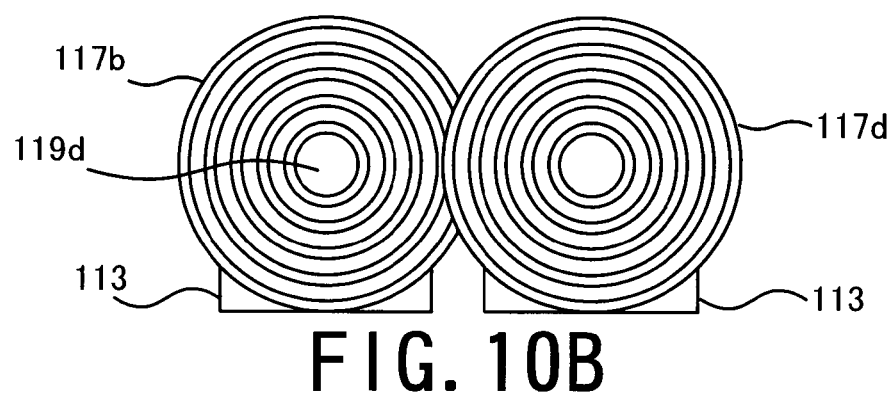

Details of the coil formation will be described below with reference to FIGS. 10A, 10B, 10C and 10D. For the pair shown in FIG. 9, at first, the lower coil layer 117b is formed above the left-side lower yoke 113, and at the same level, the first insulating layer 119b is formed above the right-side lower yoke 113, as shown in FIG. 10A. Then, the lower coil layer 117d is formed above the right-side first insulating layer 119b, and at the same level, the second insulating layer 119d is formed above the left-side lower coil layer 117b, as shown in FIG. 10B. Upon formation of the right-side lower coil layer 117d, the lower coil layer 117d is disposed to have its left end overlie the right end of the left-side lower coil layer 117b.

Figure 10C:
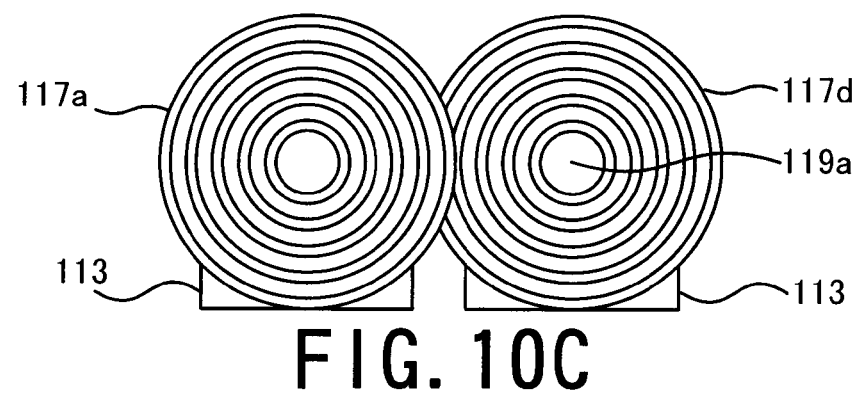
Figure 10D:
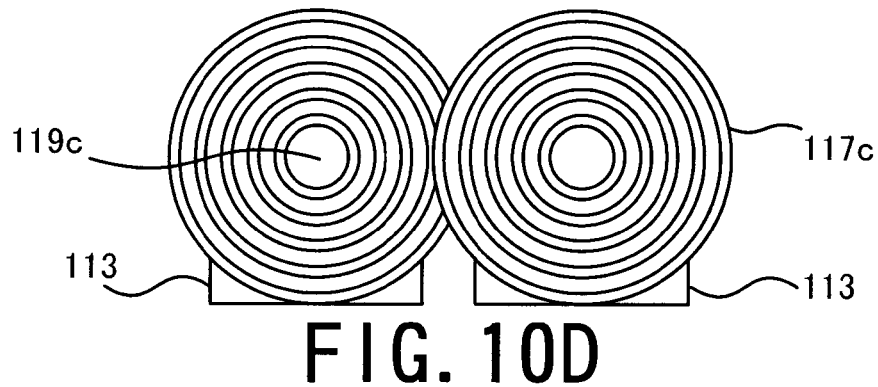

Then, the upper coil layer 117a is formed above the left-side second insulating layer 119d, and at the same level, the third insulating layer 119a is formed above the right-side lower coil layer 117d, as shown in FIG. 10C. Upon formation of the left-side upper coil layer 117a, the upper coil layer 117a is disposed to have its right end overlie the left end of the right-side lower coil layer 117d. Moreover, the upper coil layer 117c is formed above the right-side third insulating layer 119a, and at the same level, the fourth insulating layer 119c is formed above the left-side upper coil layer 117a, as shown in FIG. 10D. Upon formation of the right-side upper coil layer 117c, the upper coil layer 117c is disposed to have its left end overlie the right end of the left-side upper coil layer 117a.

After the formation of the write elements 105 including the coils 117 is finished, a spacer layer 125b is subsequently formed above the write elements 105, as shown in FIG. 8. Furthermore, the lower magnetic shields 123, the read elements 107, the upper magnetic shields 121 and a protective layer 125e are formed above it.

Figure 11:
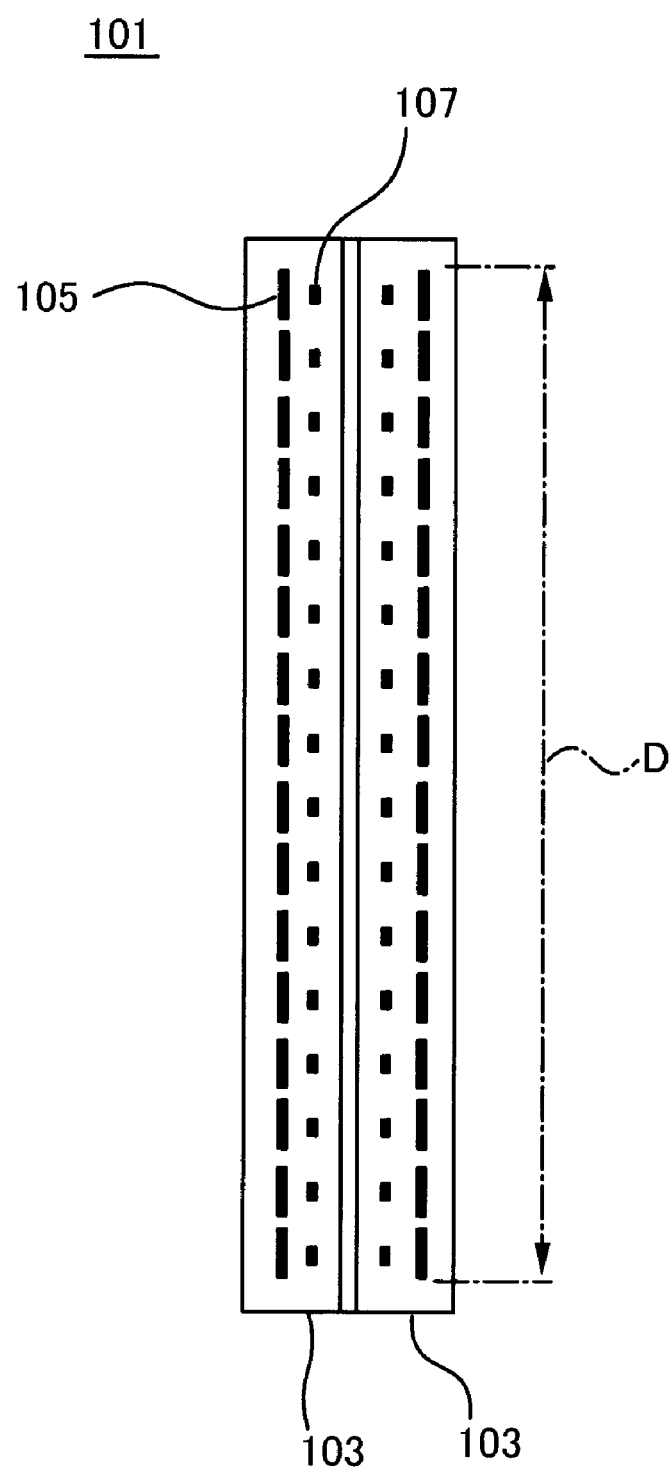
FIG. 11 is a view showing the number of write elements and read elements within a given dimension in a track width direction.

In the foregoing multi-channel head 101, the coils have different positions in the lamination direction in the pairs of write elements adjacent each other in the track width direction. Therefore, the coil layers 117a, 117b, 117c, 117d of the offset coils 117 look as if they overlap with each other in the plan view but are actually not in contact with each other, and the distance between the write elements 105 in the track width direction X can be reduced accordingly, which results in a smaller pitch. Concretely, as shown in FIG. 11, sixteen element pairs 109, i.e., sixteen write elements 105 and sixteen read elements 107 can be arranged within a dimension D=2.5 mm in the track width direction X.

In addition, while the coils have different positions in the lamination direction, as described above, the lower and upper pole portions 113a, 115a are respectively aligned to be level with each other in the lamination direction between the write elements arranged in the track width direction. Therefore, the pole portions of the write elements 105 aligned in the track width direction X can be formed by performing film formation processes for two layers, avoiding an increase in complexity of the process. Furthermore, since the lower and upper pole portions of the write elements 105 aligned in the track width direction X are respectively aligned in the track width direction X, writing accuracy can be kept high. That is, although the coils 117 have different positions in the lamination direction so as to reduce the pitch, as set forth above, increase in complexity of the process can be avoided and writing accuracy can be kept high.

While the present invention has been particularly shown and described with reference to embodiments thereof, it will be understood by those skilled in the art that various changes in form and detail may be made therein without departing from the spirit, scope and teaching of the invention.

What is claimed is:

1. A multi-channel head comprising:
a substrate;
a plurality of write elements arranged in a track width direction above said substrate in a lamination direction; and
a plurality of read elements arranged in a track width direction,
wherein said plurality of read elements are aligned in a single line, and
said plurality of write elements are aligned in two lines, that are next to said single line of said plurality of read elements, in a staggered manner to alternate between said two lines such that every other write element is aligned, and each line includes at least two write elements,
said plurality of write elements include coils having two layers, and
each pair of adjacent ends of said coils has an overlap area in said track width direction, wherein each of said two layers alternately overlap with each other as viewed in said lamination direction.

2. The multi-channel head of claim 1, which includes two strip-shaped head chips symmetrically bonded together, wherein each head chip includes said plurality of write elements and said plurality of read elements.

3. The multi-channel head of claim 1, in which one of said write elements has an upper pole portion and a lower pole portion by which said coil is sandwiched in said lamination direction,
wherein said upper and lower pole portions of said write elements are respectively aligned to be level with each other in said lamination direction.

4. The multi-channel head of claim 1, wherein all said plurality of read elements are level with each other in said lamination direction.

5. The multi-channel head of claim 1, wherein a distance between an uppermost one of said plurality of write elements in said lamination direction and a read element paired therewith in said lamination direction is set equal to or greater than 3.0 μm.

6. The multi-channel head of claim 1, wherein a yoke-to-yoke distance between adjacent write elements offset from each other in said lamination direction is set equal to or greater than 3.0 μm.

* * * * *